United States Patent
Taborek, Sr. et al.

(10) Patent No.: US 7,020,729 B2
(45) Date of Patent: Mar. 28, 2006

(54) PROTOCOL INDEPENDENT DATA TRANSMISSION INTERFACE

(75) Inventors: Richard Taborek, Sr., Campbell, CA (US); Donald W. Alderrou, Sunnyvale, CA (US); Steve Dreyer, Sunnyvale, CA (US); Gary Rara, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 429 days.

(21) Appl. No.: 10/147,847

(22) Filed: May 16, 2002

(65) Prior Publication Data

US 2003/0217215 A1 Nov. 20, 2003

(51) Int. Cl.
G06F 13/14 (2006.01)

(52) U.S. Cl. .................. 710/305; 710/10; 710/14; 714/700; 709/231; 375/260; 370/503

(58) Field of Classification Search ........... 370/911, 370/910, 908, 535, 465, 476, 503; 375/260; 709/231; 714/700; 710/10, 14, 305
See application file for complete search history.

(56) References Cited

U.S. PATENT DOCUMENTS

| | | | | |
|---|---|---|---|---|
| 3,812,531 A | * | 5/1974 | Hall .............................. 360/26 |
| 4,486,739 A | | 12/1984 | Franaszek et al. |
| 5,408,473 A | * | 4/1995 | Hutchison et al. .......... 370/506 |
| 5,696,899 A | * | 12/1997 | Kalwitz ....................... 709/228 |
| 5,784,622 A | * | 7/1998 | Kalwitz et al. ............. 710/200 |
| 6,026,088 A | * | 2/2000 | Rostoker et al. ....... 370/395.53 |
| 6,067,585 A | * | 5/2000 | Hoang .......................... 710/11 |
| 6,081,523 A | * | 6/2000 | Merchant et al. ........... 370/389 |
| 6,175,556 B1 | | 1/2001 | Allen, Jr. et al. |
| 6,222,852 B1 | * | 4/2001 | Gandy ......................... 370/463 |
| 6,430,201 B1 | * | 8/2002 | Azizoglu et al. ........... 370/535 |
| 6,654,383 B1 | * | 11/2003 | Haymes et al. ............. 370/466 |
| 6,704,890 B1 | * | 3/2004 | Carotti et al. ............... 714/700 |
| 6,750,675 B1 | * | 6/2004 | Venkata et al. ............... 326/41 |
| 6,862,701 B1 | * | 3/2005 | Walker et al. .............. 714/715 |
| 6,871,301 B1 | * | 3/2005 | Deng .......................... 714/700 |
| 2002/0194415 A1 | * | 12/2002 | Lindsay et al. ............. 710/305 |
| 2003/0052709 A1 | * | 3/2003 | Venkata et al. ............... 326/37 |
| 2003/0099260 A1 | * | 5/2003 | Bunton ........................ 370/535 |
| 2003/0196132 A1 | * | 10/2003 | Chiang ....................... 713/503 |
| 2004/0088633 A1 | * | 5/2004 | Lida et al. .................. 714/752 |
| 2004/0141569 A1 | * | 7/2004 | Agazzi ........................ 375/302 |
| 2004/0151507 A1 | * | 8/2004 | Agazzi ........................ 398/141 |
| 2004/0170226 A1 | * | 9/2004 | Agazzi ........................ 375/260 |

OTHER PUBLICATIONS

D'Ambrosia, John, et al., "XAUI: An Overview", Mar. 2002, Ver. 1.*

Taborek, Sr., Richard, "10GFC WAN PHY -10GFC over SONET/SDH-: An FC-BB-2/10GFC Proposal," Dec. 4, 2000, nSerial Corporation, p. 1-18.*

Taborek, Sr., Richard, "10 GFC Management Interface and Register Set Proposal," Aug. 8, 2000, nSerial Corporation, p. 1-12.*

(Continued)

*Primary Examiner*—Glenn A. Auve
*Assistant Examiner*—Donna K. Mason
(74) *Attorney, Agent, or Firm*—Glen B. Choi

(57) ABSTRACT

Transmitting data across a scalable, flexible speed, serial bus in a communication protocol independent manner.

50 Claims, 4 Drawing Sheets

OTHER PUBLICATIONS

XAUI/XGXS Proposal, IEEE 802.3ae Task Force, May 23-25, 2000. 28 pages.

Conover, Joel; "Networking for the Next Generation," Network & Systems Infrastructure Workshop, http:www.nwc.com/shared/printArticle?article=nc/1213/1213ws2full.html&pub=nwc;4 pgs.

Taborke, Rich; "XAUI-768 Proposal for SFI-5, SPI-5," Optical Internetworking Forum, Jan. 7-8, 2000, 24 pages.

Johansen, Henrik & Toborek, Rich; "SFI-4 Phase 2 Proposal," Optical Internetworking Forum, Nov. 5, 2001; 29 pages.

"Media Access Control (MAC) Parameters, Physical Layer, and Management Parameters for 10Gb/s Operation"; P802.3ae Draft Supplement to Carrier Sense Multiple Access with Collision Detection (CSMA/CD) Access Method & Physical Layer Specifications, IEEE Computer Society, Feb. 2002, 540 pages.

"Infiniband Architecture Release 1.0, vol. 1, General Specifications", Infinibandtm Architecture Specification, Oct. 24, 2000, pp. 1-880, XP002214159.

* cited by examiner

PROTOCOL INDEPENDENT DATA TRANSMISSION INTERFACE

TECHNICAL FIELD

Embodiments of the invention relate to an apparatus and method for transmitting data across an IEEE P802.3ae 10 Gigabit Attachment Unit (XAUI) bus in a protocol independent manner.

BACKGROUND

A communication bus coupled between high performance devices, such as a communication bus providing for interconnection between integrated circuits (for "chip to chip" communication), Input/Output (I/O) devices, or between printed circuit boards via a connector, may need to operate at very high communication speeds. Moreover, interface logic and pin counts for implementing the bus may need to be minimized to reduce cost and complexity of the device in, or devices between, which the bus is located. Generally, a parallel bus will not meet the needs of many of today's applications due to being limited in operation to relatively slow data transmission speeds of one billion bits per second or less per parallel signal. A simple serial signal, although generally capable of operating at faster speeds than a parallel bus, will not meet today's needs as well, based at least in part on bandwidth demands. Applications today may require multiple serial signals operating in parallel to overcome these limitations. A parallel arrangement of serial signals is henceforth referred to as a "serial bus".

A bus generally contains control lines and data lines. A synchronous bus generally is capable of operating at faster speeds than an asynchronous bus because no handshaking protocol is required. Additionally, because a fixed protocol typically is used for communicating data over the bus, the interface logic to implement the protocol is minimal and the bus can operate very fast relative to an asynchronous bus.

However, a synchronous bus includes a clock in the control lines and requires a fixed protocol for communicating data over the bus based on the clock. Thus, devices connected to the synchronous bus must operate at the same clock rate and participate in the fixed communication protocol. As a result, although many different synchronous bus architectures exist today, they are intimately tied to a predetermined communication protocol. This predetermined communication protocol can be a significant limitation, for example, when a device coupled to the bus has data formatted or framed according to different communication protocols, and is to transmit the data across the bus. Additionally, because of well known clock and data skew problems, the longer a synchronous bus, generally speaking, the slower the speed of the bus.

The Institute of Electrical and Electronics Engineers (IEEE) has proposed a standard for extending the operational distance of the 10 Gigabit Media Independent Interface (XGMII) parallel bus and reducing the number of interface signals between the Media Access Control (MAC) and Physical Layer Device (PHY) components in a 10 Gigabit Ethernet system (hereafter "10 GbE system" or simply "10 GbE"). The proposal, expected to be ratified in mid 2002, set forth in clauses 47 and 48 of the IEEE Draft P802.3ae, a supplement to the IEEE Std. 802.3, Carrier Sense Multiple Access with Collision Detection (CSMA/CD) access method and physical layer specifications, defines the electrical and functional characteristics for an optional 10 Gigabit Media Independent Interface (XGMII) eXtender Sublayer (XGXS) and a 10 Gigabit Attachment Unit Interface (XAUI) serial bus. (The "X" in "XAUI" represents the Roman numeral for ten and implies ten billion bits per second, that is, 10 gigabits per second, or 10 Gb/s.)

In a 10 GbE system implementing the optional XGMII extender, the XAUI bus receives a packet byte stream from the MAC or PHY, depending on the direction of packet flow, separates the packet byte stream into multiple serial binary digit (bit) streams for transmission over a corresponding number of physical communication paths ("lanes"), and encodes the bit stream to be transmitted on each lane using an industry standard 8B/10B coding scheme defined in U.S. Pat. No. 4,486,739 issued to Franaszek. The 8B/10B coding scheme translates an eight-bit byte of information into 10 binary digits for transmission over electromagnetic or optical transmission lines. Other well known serial signal and bus architectures use the 8B/10B coding scheme as well, such as InfiniBand (See *InfiniBand™ Architecture Specification Release* 1.0, Volume 2—Physical Specifications, Chapter 5: Link/Phy Interface), Fibre Channel (See ANSI NCITS T11 Fibre Channel Standards), and the 3GIO high speed I/O interconnect serial bus architecture, promulgated by the Third Generation Peripheral Component Interconnect Special Interest Group (3GIO PCI-SIG) (see http://www.pcisig.com).

However, the XAUI bus, heretofore, has not been implemented in a device in such a way as to be capable of supporting the transmission of one or more different data streams in a protocol independent manner over the bus. Some data streams, such as circuit switched, as opposed to packet switched, data streams, do not use or cannot take advantage of the 8B/10B coding scheme, for example, SONET (Synchronous Optical NETwork) data streams. (For a description of SONET, see ANSI T1.105: SONET—Basic Description including Multiplex Structure, Rates and Formats).

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
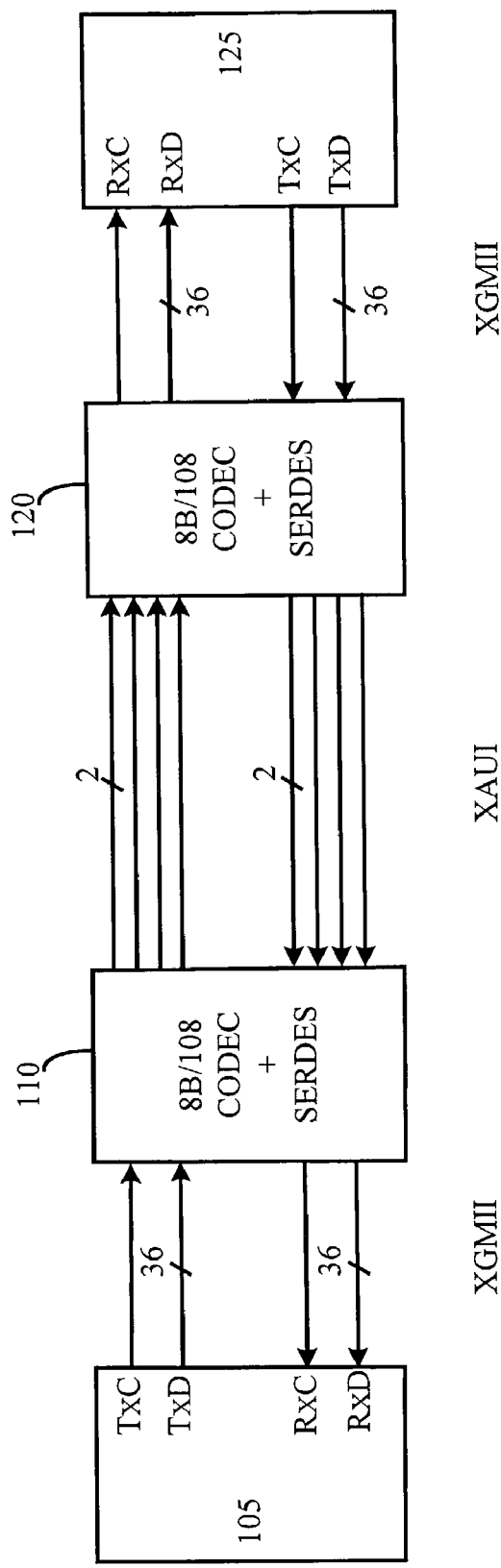
FIG. 1 is block diagram of a typical prior art 10 Gigabit Attachment Unit Interface circuit.

The 10 GbE proposal, set forth in the IEEE Draft P802.3ae specification, defines a 10 Gigabit per second Media Independent Interface (XGMII) parallel bus architecture, comprising 74 signals (including two 32-bit data paths, one in a transmit direction, and one in a receive direction; four control signals; and one clock signal). The XGMII couples the Ethernet Media Access Control (MAC) layer component (the MAC layer corresponds to the International Standard Organization's Open Systems Interconnection (OSI) layer 2 Data Link layer protocol) to an Ethernet Physical (PHY) layer device (the PHY layer device corresponds to a portion of the OSI layer 1 Physical layer protocol).

The 10 GbE specification further proposes an optional XGMII extension, comprising two 10 Gigabit Media Independent Interface (XGMII) eXtender Sublayers (XGXS) and a XAUI bus between them (the "optional XGMII extender"; or simply "XGMII extender"), which provides for extending the XGMII, for example, up to approximately 20 inches in length in Printed Circuit Board (PCB) traces. The optional XGMII extender typically extends XGMII in chip-to-chip (integrated circuit-to-integrated circuit) applications such as occurs in most Ethernet MAC to PHY interconnect implementations. However, it is contemplated XAUI may be implemented not only as a point-to-point bus between integrated circuits (ICs) in a single board using traces on a PCB, but other environments as well, including implementing a high speed interconnect between boards, either directly, or to a backplane.

Using the optional XGMII extender, a MAC to XGMII to PHY parallel bus interconnection becomes a MAC to XGMII to XGXS to XAUI to XGXS to XGMII to PHY interconnection. A source XGXS converts the data stream received in parallel from an XGMII to multiple serial bit streams for transmission over the XAUI serial bus, whereupon receipt at the destination XGXS, the serial bit streams are converted back to a parallel byte stream for transmission over an XGMII, as further described below.

In the XGMII extender, one instance of an XGXS operates as a source to the XAUI data path in the transmit direction (from the MAC to the PHY) and as a destination in the receive direction. The other instance of an XGXS operates as a destination of the XAUI data path in the transmit direction and a source in the receive path. Each XAUI path (transmit and receive) comprises four bit-serial lanes. The XGXS uses the same code and coding rules as the 10 GbE Physical Coding Sublayer (PCS) and Physical Medium Attachment (PMA) defined in the IEEE Draft P802.3ae specification. The source XGXS takes data streams, in particular, byte data streams separated in four parallel communication paths ("striped over four lanes") as its input, maps data and control characters in the streams into XAUI code-groups, and encodes them for transmission over the XAUI bus. The destination XGXS decodes the XAUI code groups, deskews the four lanes, compensates for any clock rate disparity between source and destination XGXS, and maps XAUI code-groups back to data and control characters. (Note: the reader is referred to the IEEE Draft IEEE P802.3ae specification, sections 48.2.3 and 48.2.4 for further information about code-groups and their use in the XGMII extender.)

The XAUI bus is a low pin count, self-timed serial bus separated into four serial communication paths, referred to as lanes. The interface comprises 16 data signals in two sets of four differential signal pairs. See IEEE Draft P802.3ae specification, FIG. 47-2. XAUI uses an 8B/10B coding scheme which provides for better signal integrity in chip-to-chip Printed Circuit Board (PCB) traces. XAUI is a scalable serial bus architecture that generally operates each lane at 3.125 GBaud, but can operate the lanes at other speeds as well, is PHY and protocol independent, and can be implemented in complementary metal oxide semiconductors (CMOS), Bipolar CMOS (BICMOS) and Silicon Germanium (SiGe) semiconductors processes.

The XAUI serial bus has many advantages over other bus architectures, including implementation flexibility due to low pin count, better noise immunity, better jitter control, lower electromagnetic interference (EMI), improved compensation for multi-bit bus skew due to self-clocking, better error detection and fault isolation capabilities, and lower power consumption. Although typically used to extend the 10 GbE MAC to PHY interconnection (XGMII) from three inches to 20 inches over PCB traces, it is contemplated the interface may be used to interconnect application specific integrated circuits (ASICs), Programmable Gate Arrays (PGAs), Field PGAs (FPGAs), processors, or combinations thereof, such as interconnecting a processor to an I/O device, or Media Access Control component, whether on or between PCBs, to name a few examples.

FIG. 1 illustrates an example optional XGMII extender implementation. A device 105, for example, a MAC component, has input and outputs corresponding to the XGMII, including a receive- and transmit-clock, RxC and TxC, respectively, and two 36-bit paths comprising: 32 parallel signal paths for data, TxD and RxD, and four parallel control signal paths. In the transmit direction (e.g., from device 105), the XMGII converts a 10 Gb/s data stream into four eight-bit byte streams, known as lanes. Device 125, for example, a PHY component, likewise has inputs and outputs corresponding to the XGMII. The XGXS functionality described above is performed by components 110 and 120.

While FIG. 1 illustrates the XGXS functionality embedded in components 110 and 120, separate from components 105 and 125, it is contemplated a single component, or integrated circuit (IC) chip, may encompass any source/destination device (e.g., MAC), the XGMII functionality, and the XGXS functionality. In such instance, the chip interface would be the XAUI—the XGMII, if present, need not be exposed. Indeed, rather than an XGMII internal to the chip, the chip could be carrying, for example, a SONET payload over a 32-bit internal data bus.

The source XGXS converts data bytes or control characters received over each one of the four byte-wide lanes of the XGMII into a self-clocked, serial, 8B/10B encoded data stream for transmission across the XAUI bus at a nominal rate of 3.125 GBaud. At the destination end of XAUI, the XGXS deskews, that is, aligns, the four lanes, compensates for clock disparity, and decodes the serial, 8B/10B encoded data streams received over the XAUI bus into data bytes or control characters for transmission over the XGMII parallel lanes. As can be seen, the XGXS components are bi-directional, are capable of operating as a source or destination, and may operate according to independent clocks.

In a 10 GbE environment, the data stream contains Ethernet packets, which have start and end of frame delimiters. Additionally, special code-groups transmitted over the XAUI bus between the delimiters, that is, between an end of frame delimiter and a start of frame delimiter, are used to synchronize the XAUI lanes, that is, deskew the lanes.

Although FIG. 1 illustrates what essentially is a 10 gigabit per second physical interface to transmit 10 GbE data, as will be described below, embodiments of the invention use the same interface for transmitting generic data in such a way that a device is capable of transmitting not only 10 GbE data, but other data, for example, SONET data, using the XAUI bus. This is achieved by modifying the operation of the XAUI bus after the bus is initialized. The modification involves separating the XAUI electrical characteristics from its functional characteristics, and modifying the functional characteristics to allow the interface to transport any type of data, whether packetized, or circuit switched.

The functional characteristics of the XAUI bus are modified to transmit SONET data in a protocol independent manner over the XAUI bus because SONET data is not packetized, that is, there are no start and end of frame delimiters, and thus, there is no interframe or interpacket gap during which to transmit special Idle code-groups that might otherwise be used to synchronize the XAUI bus, deskew the lanes, and adjust for clock disparity between the source and destination.

In essence, the modified XAUI bus operates as a serial communications bus to transmit only data, and issues related to operation of the bus, e.g., synchronization, deskew (alignment), crossing multiple clock domains, etc., are resolved during bus initialization but then ignored during bus operation. The modified XAUI operates in a mode that tracks deskew and synchronization through the detection of code-group errors at the receiver, thereby allowing data that has no encoding, e.g., SONET data, to be transparently transported across the XAUI.

In accordance with embodiments of the invention, to the extent any errors occur on the XAUI bus while operating in a modified state, the errors are isolated to the bus. Data received from the XAUI bus may be checked for integrity, and if an error is detected, it is attributed to the XAUI bus. In this manner, data checking occurs without the need for extra bus signals to validate error free transmission of the data across the XAUI bus, a significant advantage over parallel bus architectures which generally need extra signals to validate that data was transmitted free of error across the parallel bus.

Note: hereinafter, an instance of a 10GBASE-X PCS function, state machine, or process, described in IEEE Draft P802.3ae specification, Clause 48, as embodied in the XGXS described in IEEE Draft P802.3ae specification, Clause 47, may be referred to simply as "the PCS function", "the PCS state machine", or "the PCS process". Furthermore, references to Clauses 47 and 48 of the IEEE Draft P802.3ae specification may be referred to simply as "Clause 47" and "Clause 48".

According to embodiments of the invention, the XAUI bus is first initialized as per Clause 48. In particular, an instance of the 10 GbE Physical Coding Sublayer (PCS), which controls the functioning of the XAUI bus, initializes the bus based on the transmission and reception of an Idle code-group sequence. The XAUI bus continuously signals, or transmits, code-groups generated by the PCS Transmit process. In particular, Idle code-groups are continuously and repetitively transmitted whenever the XAUI bus is idle. Since the XAUI bus is a full-duplex serial bus, the Idle code-groups are capable of being transmitted in both directions. The PCS Synchronization process continuously accepts code-groups, obtains 10-bit code-group synchronization, and conveys the synchronized 10-bit code-groups to the PCS Deskew process, which aligns the code-groups to remove skew between the lanes that has been introduced by the bus.

Once the XAUI bus is initialized according to the link initialization process and in an operational state as described in Clause 48, the operation of the PCS functions embodied in the XAUI bus is modified in a number of ways to provide for transmitting any type of data over the XAUI bus, according to various embodiments of the invention, as described below. The modified operational state is referred to herein as data agnostic mode, meaning data can be transmitted in a protocol independent manner across the XAUI bus while the bus is in the modified operational state.

Figure 2:
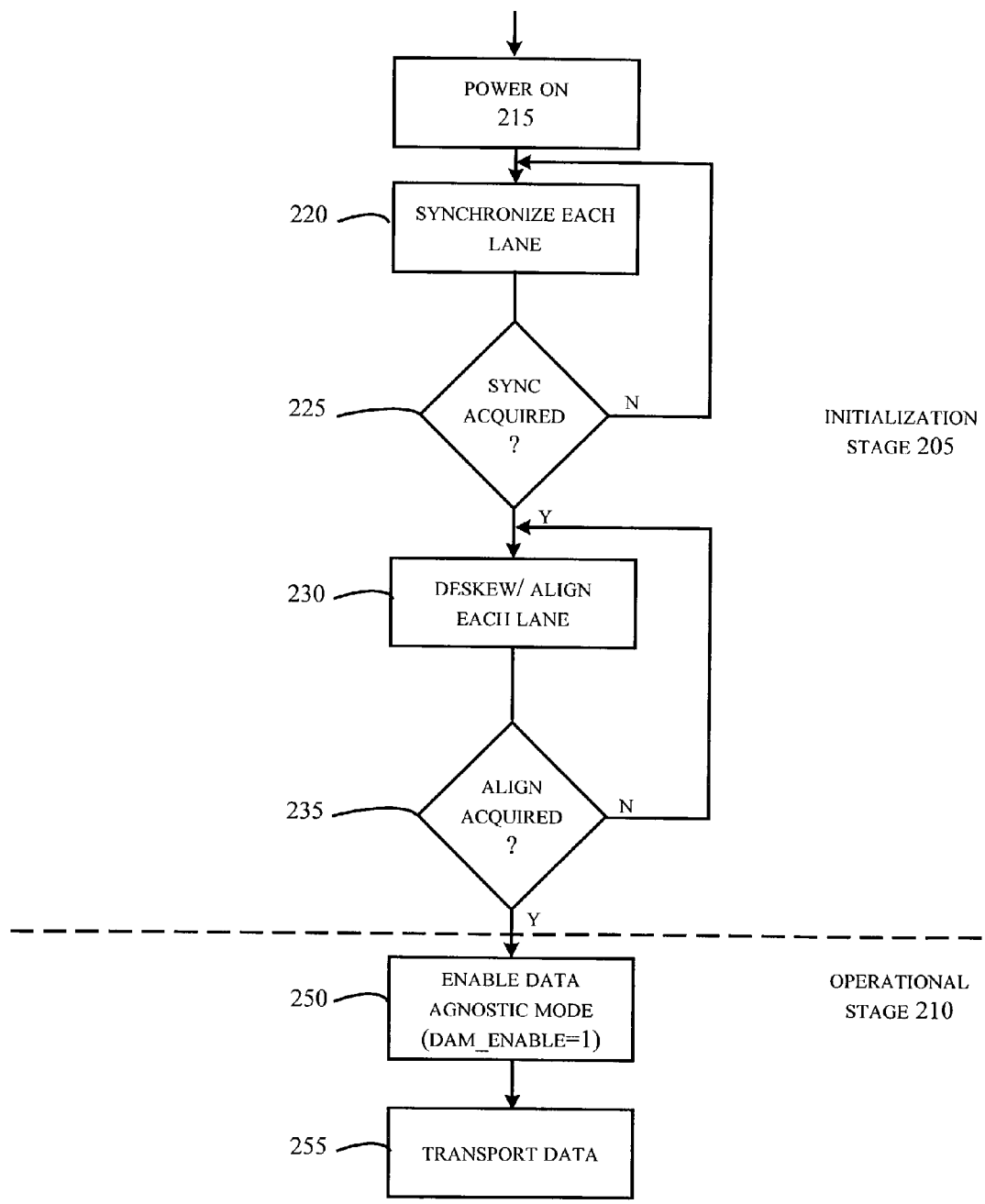
FIG. 2 is a flow chart of an embodiment of the invention.

FIG. 2 provides a flow chart illustrating an embodiment of the invention. The process starts upon power up at 215 and follows to synchronizing each XAUI lane at 220, as part of the XAUI bus initialization stage 205. The synchronizing process is responsible for determining whether the XAUI bus is ready for operation. The process operates independently on each lane, and is complete when synchronization is obtained on each lane. As part of the synchronization process, the XAUI bus continuously converts Idle control characters to synchronization code groups, including locating the 10-bit boundaries for the 8B/10B codes, to enable serial lane synchronization, and lane-to-lane alignment.

Once synchronization is complete, the initialization stage continues on to a deskew and alignment process at 230. The deskew process tests whether the XAUI bus is not only ready for operation, but is capable of presenting valid data upon exiting the bus. Since related data is to be put on the bus at the same time, the data needs to be pulled off the bus at the same time as well. The deskew process attempts to deskew the continuously transmitted special alignment code-groups being transmitted over the bus to an alignment pattern as part of the bus initialization process to ensure related data is transmitted in an aligned fashion once the bus is in an operational state and transmitting valid data. Once alignment is acquired at 235, initialization of the XAUI bus is considered complete and the bus now transitions to an operational stage 210.

Upon entering the operational stage 210, an embodiment of the invention disables the synchronization, initialization and link status reporting processes of the PCS. In one embodiment of the invention, upon entering the operational stage, a variable is set to a value to indicate the bus is operating in a data agnostic manner, that is, transmitting data without regard to code-group synchronization and alignment. So long as the variable is set to such value, any data transmitted across the XAUI bus is indeed transmitted without checking for code-group synchronization or lane-to-lane deskew, or adjusting the transmission of data to account for or resolve any code-group synchronization or lane-to-lane deskew problems. However, the lane-based PCS Synchronization process continuously validates all received code-groups, insuring that proper lane synchronization and lane-to-lane alignment is maintained. For example, a variable, DAM_enable, indicates a data agnostic mode of operation is enabled over the XAUI bus when set to one value, and disabled when set to another value.

Even though the XAUI bus is synchronized and its lanes aligned upon entering the operational stage 210, due to factors such as environmental conditions (e.g., temperature variations, varying EMI levels, etc.), synchronization problems and dynamic skew can occur while the bus is transmitting data streams. Such instances can be remedied by clock and data recovery circuitry, and XAUI deskew logic, in the XAUI bus architecture. Moreover, all data transmitted across the XAUI bus is checked for integrity in accordance with 8B/10B lane code violation checking. The 8B/10B lane code violation checking guarantees that lane synchronization and lane-to-lane alignment is maintained within acceptable ranges. Importantly, however, such synchronization and alignment is maintained by the XAUI bus itself, without any special code-group transmissions, interpacket gaps, start- or end-of-frame delimiters normally associated with the PCS functions embodied in XAUI, but not used while the bus is operating in data agnostic mode.

In this manner, any type of data, whether 10 GbE data, SONET payload, or other type of data, may be transmitted continuously across the XAUI bus without the need to interrupt, adjust or alter the data transmission in any way, for example, to transmit the special code-groups that would otherwise be needed to maintain synchronization, delimiting of packets, and lane-to-lane alignment. This is made possible, in part, by the clock and data recovery circuitry of the XAUI, which, after initialization of the bus, allows for near zero bit error rates, and the 8B/10B coding scheme used by the XAUI bus that provides very good signal integrity across the bus.

Note: the following discussion specifically points out where embodiments of the invention diverge from the various state PCS functions, processes, and state machines described in Clause 48. The reader is referred thereto for a complete description of the PCS functions and corresponding state machines contemplated by the IEEE Draft P802.3ae specification.

According to one embodiment of the invention, the PCS deskew state machine (Clause 48, FIG. 48-8) is modified so that it does not check for alignment errors while the XAUI bus is in the operational stage and data agnostic mode is enabled. Rather, the PCS deskew state machine remains in state ALIGN_ACQUIRED_1, indicating all XAUI serial communication paths ("lanes") are aligned with respect to each other, whether indeed that is the case or not, insofar as the PCS deskew process is concerned.

Additionally, the PCS transmit source state machine (Clause 48, FIG. 48-6) and the PCS receive state machine (Clause 48, FIG. 48-9) are altered, in an embodiment of the invention, to not modify the data stream as otherwise required under Clause 48 to indicate idle and data frame boundaries, when the XAUI bus is operating in data agnostic mode. Transmission of any valid 8B/10B code-groups can begin upon the PCS deskew process entering the state ALIGN_ACQUIRED_1, and as mentioned above, in one embodiment of the invention, the PCS deskew state machine remains in that state while the XAUI bus is operating in data agnostic mode. The PCS transmit source state machine remains in state SEND_DATA and does not call the function cvtx_terminate, thereby disabling code-group synchronization functions while the bus is operating in data agnostic mode. (cvtx_terminate is a conversion function used by the PCS transmit process when the code-group Terminate is detected in the data stream to convert Idle control characters to synchronization code-groups).

Likewise, the PCS receive state machine, once the XAUI bus is operational and in data agnostic mode, remains in state DATA_MODE, according to an embodiment of the invention. The PCS receive process does not, therefore, respond to detected fault conditions, and the PCS deskew process either does not send a signal conveying a value of a column of code-groups over each XAUI lane so that the PCS receive process can check for fault conditions, or if the signal is sent, it is ignored by the PCS receive process. However, in one embodiment of the invention, loss of synchronization on any XAUI lane, as per normal operation of the PCS synchronization state machine (Clause 48, FIG. 48-7) results in link reinitialization.

Tracking when the PCS is in a modified operational state can be accomplished many ways. In one embodiment of the invention, a variable accessible to the PCS transmit source, receive, and deskew, state machines can be set to a value indicating the PCS is operating in data agnostic mode. For example, a variable DAM_enable (named for "Data Agnostic Mode enabled") may be set to a value of one to indicate data agnostic mode operation. DAM_enable=1 only after the link initialization process described in Clause 48 is complete, and conversely, ignored during the link initialization process.

According to one embodiment of the invention, the XAUI bus can operate in a data agnostic mode under management control. Management control is possible, for example, in one embodiment of the invention, via the Ethernet Management Data Input/Output (MDIO) interface and register set specified in Clause 45, or an equivalent management interface.

Altering the PCS functions as described above enables the use of the XAUI bus in a data agnostic, or protocol independent, manner. Normal PCS functionality requires data stream framing and data delineation in support of IEEE 802.3 Media Access Control (MAC) operations. In accordance with embodiments of the invention, such framing and data delineation is not performed. Embodiments of the invention enable the use of the XAUI bus to replace a data agnostic, general purpose, parallel bus such as defined in the Optical Internetworking Forum (OIF) Physical and Link Layer (PLL) Working Group (WG) proposals for System Packet Interface-4 (SPI-4) and SerDes to Framer Interface-5 (SFI-5) physical transport for SONET data streams. Also, the self-clocking nature of the XAUI bus, wherein the clock is embedded in the data, allows the extension of the XAUI bus in terms of lane data rate and scalability of the bus in terms of the number of lanes, to address both lower and higher speed data bus requirements, depending on the desired application.

In the 10 Gigabit PHY specifications set forth in the IEEE Draft 802.3ae specification, the PHY layer comprises the Physical Coding Sublayer (PCS), the Physical Medium Attachment (PMA) sublayer, and the Physical Dependent Medium (PMD) sublayer. Fiber optics modules are implemented at the Physical Dependent Medium (PMD) sublayer. The PMA typically provides a medium-independent means for the PCS to support the use of a range of serial-bit-oriented physical media, and performs, among other things, mapping of code-groups between the PCS and PMA, serialization and deserialization (SerDes) of code-groups for transmission or reception on the PMD, and clock recovery from code-groups supplied by the PMD.

Figure 3:
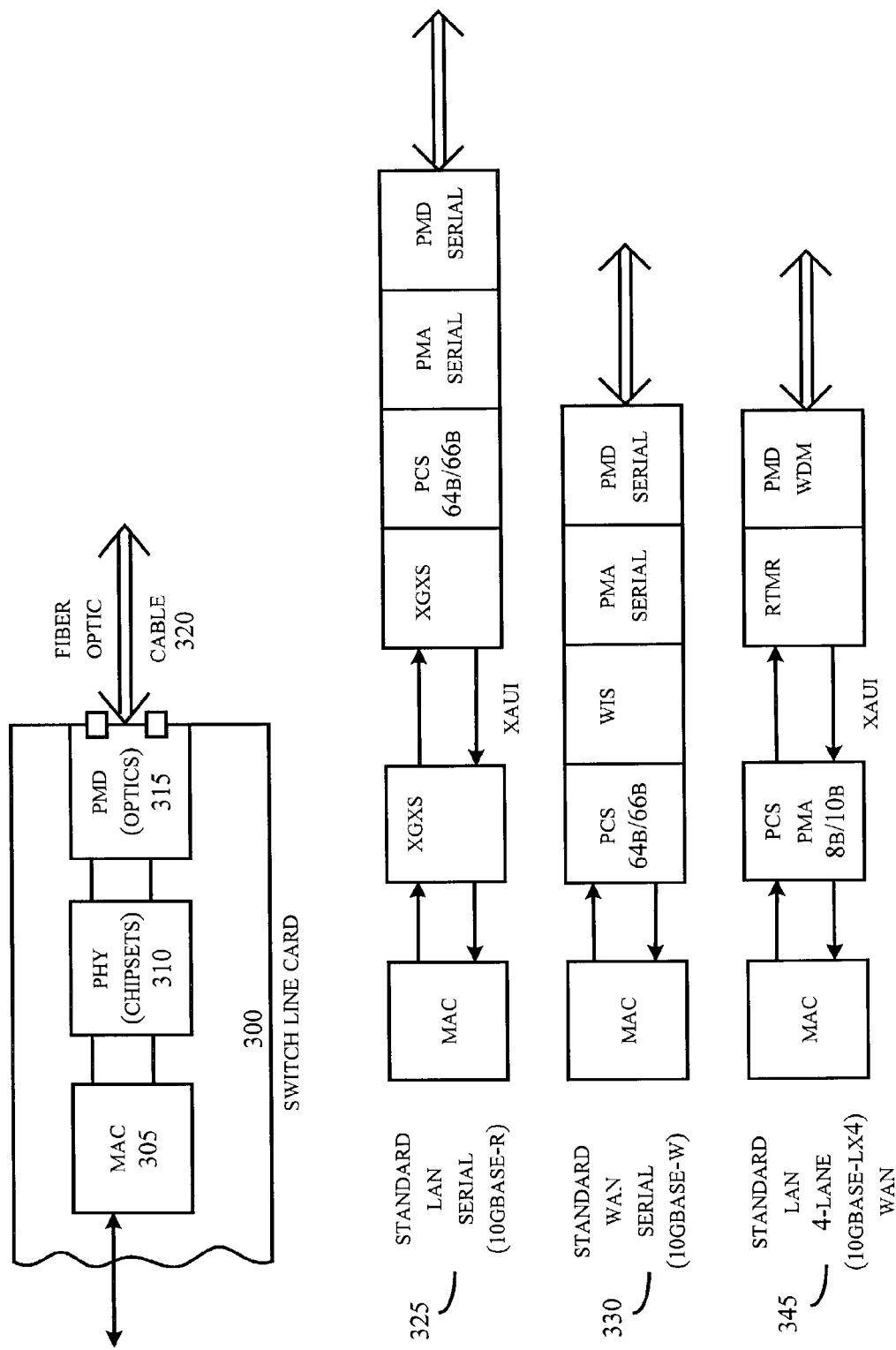
FIG. 3 is block diagram of prior art 10 Gigabit Ethernet logic and interfaces.

FIG. 3 illustrates the high level block lay out of a switch or router line card, including the PMD(s), PHY(s) and MAC. Line card 300 comprises a MAC 305 that communicates with, for example, upper layers of a protocol stack, a switching fabric (whether a cross-bar, backplane, or meshed interconnected switching fabric), or processor. The PHY 310, comprising one or more chipsets, couples the MAC to the fiber optic modules at the PMD component 315, for example, an optics module, which, in turn, couples the line card to a fiber optic cable 320.

FIG. 3 further illustrates the standard blocks and interfaces for a 10 GbE compliant device. Note: in 10GBASE-X media types, "X" denotes 8B/10B signal encoding, while the "R" in 10GBASE-R denotes 64B/66B encoding and the "W" in 10 GBASE-W denotes the Wide Area Network (WAN) Interface Sublayer (WIS) interface that encapsulates Ethernet frames for transmission over a SONET OC-192 channel. 10GBASE-LX4—uses wave division multiplexing (WDM) technology to send signals over four wavelengths of light carried over a single pair of fiber optic cables.

In the standard 10 GbE LAN serial protocol stack 325, that is, in the 10 GbE protocol stack proposed in the IEEE Draft P802.3ae specification, the MAC couples to the PHY, either directly or optionally via the XGMII extender sublayer (an XGXS pair interconnected by a XAUI bus). In this case, the PHY component comprises a PCS component with a 64B/66B enCODer/DECoder (CODEC) in the PCS that performs packet delineation and a serializer/deserializer (SerDes) in the PMA. In the transmit direction (from the MAC to the fiber optic cable), the SerDes serializes 16-bit parallel data paths (644 Mb/s each) into one 10.3 Gb/s serial data stream for serial optics in the PMD.

A line card supporting the 10 GbE LAN serial protocol stack may include a MAC chip coupled to a PHY chip that implements the XGXS between the MAC and XAUI. The PHY chip, in turn, is coupled to an optical module that comprises the rightmost four blocks illustrated at 325, namely, the XGXS function, PCS 64B/66B, PMA serial and PMD serial. A standard XAUI implementation may be used as the interface between the PHY chip and the optics module.

The standard 10 GbE Wide Area Network (WAN) serial protocol stack 330 comprises a 64B/66B CODEC in the PCS, and a SerDes in the PMA. The speed of the serial data stream is 9.58464 Gb/s (SONET OC-192) and the 16-bit parallel data paths in the PMA are operating at 622 Mb/s each. The function provided by the WIS component is described in the IEEE Draft P802.3ae specification, Clause 50. Generally speaking, the WIS allows 10 GbE equipment to be compatible with the Synchronous Optical Network (SONET) OC-192 transmission format. SONET equipment is commonly used to carry data communications over long distances, and the OC-192 format provides an effective data throughput of 9.58464 Gb/s. The WIS constrains the throughput of 10 GbE to match the SONET OC-192 speed. The WAN PHY differs from the LAN PHY used in the standard LAN serial protocol stack described above, primarily by including the WIS to provide a simplified SONET framer and $X^7+X^6+1$ scrambler.

Figure 4:
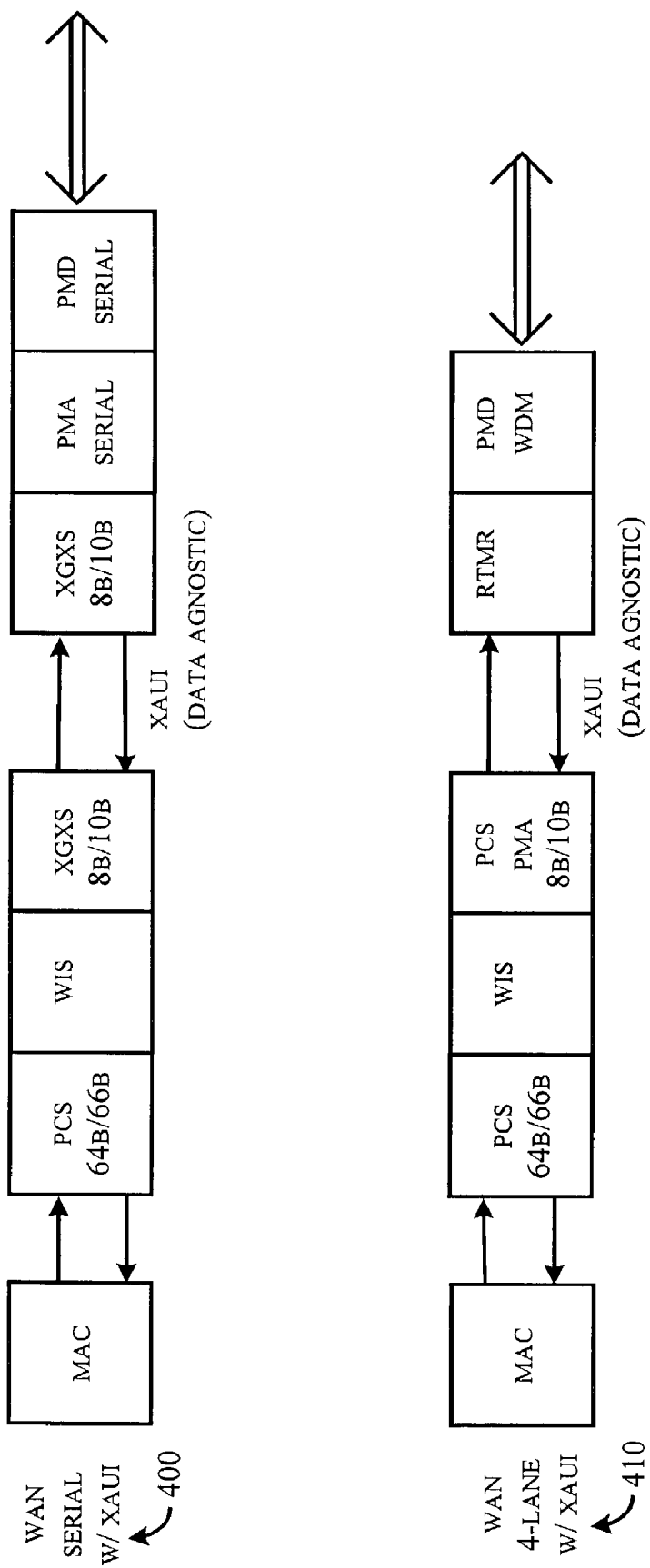
FIG. 4 is a block diagram of embodiments of the invention.

With reference to FIG. 4, a non-standard 10 GbE WAN serial protocol stack 400, in accordance with an embodiment of the invention, is illustrated. The stack 400 uses a XAUI bus capable of operating in a data agnostic manner, in accordance with an embodiment of the invention. In this configuration, a PHY chip, comprising the PCS, WIS and XGXS components, is coupled via a XAUI interface to an optics module, which comprises a corresponding XGXS component, followed by the PMA and PMD optics.

A line card supporting this nonstandard 10 GE WAN serial protocol stack can use the same PHY chip/optics module configuration used in the 10 GbE LAN serial protocol stack 325 described above with reference to FIG. 3. The XAUI bus between the PHY and optical module operates in data agnostic mode, at a speed of 3.11 Gb/s rather than 3.125 Gb/s since the interface needs to match the speed of SONET rather than Ethernet at this point.

Bus speed regulation is isolated to the MAC-to-WIS data paths where the 10.0 Gb/s Ethernet MAC implements rate control in order to support the 9.952 GBaud line rate of SONET OC-192. The interface rate of the WAN PHY and WIS is 9.952 GBaud irrespective of data agnostic mode. When data agnostic mode is enabled, each of the four XAUI lanes carries exactly one quarter of the WIS rate. Since all data is 8B/10B encoded over XAUI, the encoded XAUI line rate is 9.952/4*10/8=3.11 Gb/s. XAUI regulates its line rate automatically by performing per lane clock and data recovery on the per lane serial bit stream. (The WAN PHY rate control mechanism is described in IEEE P802.3ae draft clauses 4, 44 and 50).

There are only three blocks to the right of the XAUI bus in the nonstandard 10 GbE WAN serial protocol stack 400, as opposed to four blocks in the standard 10 GbE LAN serial protocol stack 325, due to the fact that the PCS 64B/66B CODEC may be bypassed because that code has already been put on the line at the interface to the MAC. By using the same optical module, operating XAUI in a data agnostic manner, and bypassing the 64B/66B CODEC in the module, the same line card that supports the standard LAN serial protocol stack may be used to support the WAN serial protocol stack as well, when operating in a data agnostic manner.

Optical modules are standard, even commodity elements. Their standardization is governed by multi-vendor Multi-Source Agreements (MSAs). Currently 10 GbE LAN PHYs utilize either a larger XENPAK MSA or a smaller XPAK MSA. Both have XAUI electrical interfaces. When the XENPAK or XPAK MSA is used in non-standard, data agnostic WAN PHY mode, the WIS is attached to the XENPAK or XPAK optical module and the 64B/66B CODEC in the optical module is bypassed.

When the line card supporting the nonstandard 10 GbE WAN serial protocol stack is powered up, the XAUI bus enters the initialization stage as described above with reference to FIG. 2, and then the operational stage, wherein it transmits and receives SONET payload as described with respect to FIG. 2. In this way, a device, for example, a switch or router line card, having a single XAUI bus, is capable of supporting multiple protocols, e.g., 10 GbE Ethernet (using the LAN serial protocol stack) and SONET (using he nonstandard WAN serial protocol stack), in a protocol independent manner.

As illustrated in FIG. 3, the standard 10 GbE LAN 4-Lane protocol stack 345 uses a XAUI bus to communicate between the PHY chip and wave division multiplex (WDM) PMD optical module. The MAC delivers Ethernet packets to the PHY chip, where they are 8B/10B encoded and transmitted across a XAUI bus into a four lane optical module. A retimer (RTMR) provides for clean up and repowering of the signals that were transmitted over a potentially 20 inch long copper bus before the signals are transmitted by lasers via the WDM PMD.

While the 10 GbE LAN 4-Lane protocol stack is proposed in the IEEE Draft P802.3ae specification, missing from the proposal is a 10 GbE WAN 4-Lane architecture. The IEEE P802.3ae task force did not propose a WAN PHY 4-Lane architecture, specifically rejecting conformance to SONET jitter, clock, and other SONET optical specifications. Instead, the task force opted for the standard 10 GbE WAN serial architecture describe above, which uses a common Ethernet PMD to provide access across a SONET infrastructure in support of Ethernet over SONET.

An embodiment of the invention, illustrated at 410 in FIG. 4, provides for a nonstandard 10 GbE WAN 4-Lane protocol stack. The XAUI bus, operating in a data agnostic mode, is transporting SONET frames, not Ethernet packets over SONET. The three blocks adjacent the MAC, namely, the PCS 64B/66B, WIS, and PCS PMA 8B/10B, make up the PHY chip and are the same three blocks used in the PHY chip in line card described above that supports the 10 GbE WAN serial protocol stack 330. Additionally, one embodiment of the invention uses the same optical module that is used in the line card described above as supporting the 10 GbE LAN 4-Lane protocol stack 325. The optical module contains the retimer (RTMR) and WDM PMD, also described above, and is coupled via XAUI bus to the PHY chip adjacent the MAC.

In one embodiment of the invention, the XAUI operating in data agnostic mode is resident in the PHY component of a line card, which in turn, is coupled to a MAC component that exchanges data over the backplane or switching fabric of a router. Alternatively, the PHY may reside in network adapter or interface card installed in a high performance computer system for connection to a network as a server, or installed in a desktop computer system that can be connected to the network via a medium dependent interface. Since a XAUI bus that operates as embodied in the invention essentially is a generic serial bus, it may be used to connect any number of different devices, on the same board, or between boards, such as integrated circuit chips, high speed I/O devices, processors, and programmable logic devices. Thus, the invention is to be limited only by the claims that follow.

What is claimed is:

1. A method, comprising:
   initializing an interface capable of transmitting data as a 10 Gb/s Attachment Unit Interface (XAUI) in a plurality of serial data paths; and
   transmitting data code-groups in each of the serial data paths once the interface is initialized while inhibiting the transmission of at least some special code-groups in the serial data paths capable of use for alignment of serial data paths in a XAUI.

2. The method of claim 1, wherein initializing the interface comprises initializing the interface in accordance with a 10 Gb/s Physical Coding Sublayer process (PCS process).

3. The method of claim 2, wherein initializing the interface in accordance with the PCS process comprises converting a plurality of control characters to a sequence of code-groups to enable synchronization of the serial data paths.

4. The method of claim 3, wherein converting a plurality of control characters to a sequence of code-groups to enable serial data path synchronization comprises converting a plurality of control characters to a sequence of code-groups to enable lane synchronization and lane-to-lane alignment of the serial data paths.

5. The method of claim 4, wherein converting the plurality of control characters to a sequence of code-groups comprises converting the plurality of control characters to a sequence of 10-bit code-groups generated by a 8B/10B block coding scheme.

6. The method of claim 3 wherein initializing the interface in accordance with the PCS process further comprises synchronizing each one of the plurality of serial data paths to determine code-group boundaries.

7. The method of claim 6, wherein initializing the interface in accordance with the PCS process further comprises aligning a plurality of code-groups transmitted across the serial data paths.

8. The method of claim 7, wherein aligning a plurality of code-groups transmitted across the serial data paths comprises aligning a plurality of code-groups transmitted continuously across the serial data paths to an alignment pattern to remove clock skew between the serial data paths.

9. The method of claim 1, further comprising encoding data for transmission across the interface after initializing the interface.

10. The method of claim 9, wherein encoding data for transmission across the interface comprises encoding data as a sequence of data code-groups for transmission across the interface.

11. The method of claim 10, wherein encoding data as a sequence of data code-groups for transmission across the interface comprises encoding data as a sequence of 10-bit data code-groups generated by a 8B/10B block coding scheme.

12. The method of claim 10, wherein encoding data as a sequence of data code-groups for transmission across the interface comprises encoding Synchronous Optical Network data as a sequence of data code-groups for transmission across the interface.

13. The method of claim 1, wherein the method further comprises preventing the insertion and transmission of any control code-groups in the serial data paths.

14. The method of claim 13, wherein preventing the insertion and transmission of any control code-groups comprises preventing the insertion and transmission of any control code-groups used to compensate for lane-to-lane skew.

15. The method of claim 13, wherein preventing the insertion and transmission of any control code-groups comprises preventing the insertion and transmission of any control code-groups used to compensate for clock rate disparity.

16. The method of claim 13, wherein preventing the insertion and transmission of any control code-groups comprises preventing the insertion and transmission of any control code-groups while transmitting the data code-groups.

17. The method of claim 1, further comprising reinitializing the interface if a loss of synchronization between serial data paths is detected.

18. The method of claim 17, wherein reinitializing the interface if a loss of synchronization between serial data paths is detected comprises reinitializing the interface in accordance with a 10 Gb/s Physical Coding Sublayer process.

19. An apparatus, comprising
   a first IEEE 802.3 compliant 10 gigabit per second Medium Independent Interface Extender Sublayer (XGXS) component coupled via an interface comprising a plurality of serial data paths to a second XGXS component to transmit 8B/10B data code-groups across the interface once the interface is initialized while inhibiting the transmission of at least some special code-groups in the serial data paths used for alignment of serial data paths in a 10 Gigabit per second Attachment Unit Interface (XAUI);
   wherein the second XGXS component is coupled to an IEEE 802.3 compliant Physical Medium Attachment (PMA) component to convert the 8B/10B data code-groups into an unencoded parallel data stream for transmission to the PMA component; and
   wherein the PMA component is coupled to a fiber optical transmission module to convert the unencoded parallel data stream to a serial data stream for transmission to the fiber optical transmission module.

20. The apparatus of claim 19, wherein the interface is capable of operating at a bit rate of 3.125 billion binary digits per second.

21. The apparatus of claim 19, further comprising:
   a Synchronous Optical Network (SONET) framer and scrambler component coupled to the first XGXS component to receive an encoded packet data stream and encapsulate the encoded packet stream for transmission over a SONET fiber optic communication medium; and
   a 64B/66B encoder/decoder (CODEC) coupled to the SONET framer and scrambler component to encode the packet data stream received by the SONET framer and scrambler.

22. A network interface, comprising:
   an optical module, including:
   a first IEEE 802.3 compliant 10 gigabit per second Medium Independent Interface Extender Sublayer (XGXS) component coupled via an interface comprising a plurality of serial data paths to a second XGXS component to transmit 8B/10B data code-groups across the interface once the interface is initialized while inhibiting the transmission of at least some special code-groups in the serial data paths used for alignment of serial data paths in a 10 Gigabit per second Attachment Unit Interface (XAUI);

wherein the second XGXS component is coupled to an IEEE 802.3 compliant Physical Medium Attachment (PMA) component to convert the 8B/10B data code-groups into an unencoded parallel data stream for transmission to the PMA component; and wherein the PMA component is capable of converting the unencoded parallel data stream to a serial data stream for transmission to a fiber optical transmission module; and a physical layer device coupled to the optical module to transmit a SONET data stream to the optical module.

23. The network interface of claim 22, wherein the physical layer device includes:

a Synchronous Optical Network (SONET) framer and scrambler component coupled to the optical module to convert data packets into a SONET data stream for transmission to the optical module.

24. The network interface of claim 22, further comprising an IEEE 802.3 compliant Media Access Control device coupled to the physical layer device to transmit MAC data packets to the physical layer device.

25. An information handling device comprising:

a switching fabric;

a media access control (MAC) device coupled to the switching fabric to receive data packets therefrom;

a physical layer device coupled to the MAC device to receive data packets therefrom;

an optical module coupled to the physical layer device, the module including:

logic coupled to the physical layer device to receive data packets therefrom, encode the data packets as 8B/10B data code-groups and transmit the data code-groups across an interface comprising a plurality of serial data paths, the interface being capable of functioning as a 10 Gigabit per second Attachment Unit Interface (XAUI), once the interface is initialized while inhibiting the transmission of at least some special code-groups in the serial data paths capable of use for alignment of serial data paths in a XAUI.

26. The device of claim 25, wherein the logic is further coupled to an IEEE 802.3 compliant Physical Medium Attachment (PMA) component to convert the 8B/10B data code-groups transmitted over the interface into an unencoded parallel data stream for transmission to the PMA component; and the PMA component converts the unencoded parallel data stream to a serial data stream for transmission to a fiber optical transmission module.

27. The device of claim 26, wherein the interface is capable of operating at a bit rate of 3.11 billion binary digits per second.

28. An apparatus, comprising:

an IEEE 802.3 compliant 8B/10B Physical Coding Sublayer component coupled via an interface, the interface comprising a plurality of serial data paths and capable of functioning as a 10 Gigabit per second Attachment Unit Interface (XAUI), to an optical module to transmit 8B/10B data code-groups across the interface once the interface is initialized while inhibiting the transmission of at least some special code-groups in the serial data paths capable of use for alignment of serial data paths in a XAUI.

29. The apparatus of claim 28, wherein the interface is capable of operating at a bit rate of 3.125 billion binary digits per second.

30. The apparatus of claim 29, wherein the optical module comprises a wave division multiplex optical communication medium component.

31. A system, comprising:

a switching fabric;

a network interface coupled to the switching fabric to exchange data packets therewith; the network interface including:

an IEEE 802.3 compliant Media Access Control device coupled to a physical layer device, the physical layer device including a Synchronous Optical Network (SONET) framer and scrambler component to convert data packets into a SONET data stream for transmission to an optical module, the physical layer device coupled via an interface, the interface comprising a plurality of serial data paths and being capable of functioning as a 10 Gigabit per second Attachment Unit Interface (XAUI), to the optical module to transmit 8B/10B data code-groups across the interface once the interface is initialized while inhibiting the transmission of at least some special code-groups in the serial data paths capable of use for alignment of serial data paths in a XAUI.

32. The system of claim 31, wherein the interface is capable of operating at a bit rate of 3.11 billion binary digits per second.

33. The system of claim 31, wherein the optical module comprises a wave division multiplex optical communication medium component.

34. A device comprising:

logic circuitry to process data received from a transmission medium according to a communication protocol;

logic circuitry to forward portions of the received data in data code groups transmitted on each of a plurality of egress serial data paths to a destination device;

logic circuitry to insert alignment information in the egress serial data paths among the data code groups when the device is operating in a first mode to process data frames received from the transmission medium according to an Ethernet protocol; and logic circuitry to omit the insertion of alignment information in the egress serial data paths among the data code groups when the device is operating in a second mode to process data received from the transmission medium according to a non-Ethernet protocol.

35. The device of claim 34, the device further comprising:

logic circuitry to receive data code groups on each of a plurality of ingress serial data paths; and logic circuitry to align the data code groups received on the plurality of ingress serial data paths based upon alignment information inserted among the received data code groups according to the Ethernet protocol when the device is operating in the first mode.

36. The device of claim 35, the device further comprising logic circuitry to align the data code groups received on the plurality of ingress serial data paths independently of alignment information inserted among the received data code groups according to the non-Ethernet protocol when the device is operating in the second mode.

37. The device of claim 36, the device further comprising logic circuitry to align the data code groups received on the plurality of ingress serial data paths based upon the detection of errors in the reception of data code groups.

38. The device of claim 34, wherein the alignment information comprises special code groups inserted in each of the egress serial data paths among the data code groups between an end of frame delimiter and start of frame delimiter.

39. A device comprising:
 logic circuitry to process data code groups received on each of a plurality of serial data paths;
 logic circuitry to align data code groups received on at least two of the serial data paths based upon alignment information inserted in the serial data paths among the data code groups when the device is operating in a first mode to process data formatted according to an Ethernet protocol; and
 logic circuitry to align data code groups received on at least two of the serial data paths independently of alignment information inserted in the serial data paths among the data code groups when the device is operating in a second mode to process data not formatted according to an Ethernet protocol.

40. The device of claim 39, wherein the alignment information comprises special code groups inserted in each of the serial data paths among the data code groups between an end of frame delimiter and start of frame delimiter.

41. The device of claim 39, the device further comprising logic circuitry to align the data code groups received on the plurality of serial data paths based upon the detection of errors in the reception of data code groups when the device is operating in the second mode.

42. A system comprising:
 a plurality of printed circuit board traces;
 a first device to process data received from a transmission medium according to a communication protocol and to forward portions of the received data in data code groups on a plurality of egress serial data paths over the printed circuit board traces;
 a second device to receive the data code groups from the egress serial data paths;
 wherein the first device further comprises:
  logic circuitry to insert alignment information in the egress serial data paths among the data code groups when the first device is operating in a first mode to process data frames received from the transmission medium according to an Ethernet protocol; and
  logic circuitry to omit the insertion of alignment information in the egress serial data paths among the data code groups when the first device is operating in a second mode to process data received from the transmission medium according to a non-Ethernet protocol.

43. The system of claim 42, wherein the transmission medium comprises fiber optic cabling and wherein the system further comprises:
 a third device to receive data from the fiber optic cabling according to a Synchronous Optical Network (SONET) protocol; and
 logic circuitry to cause the first and second devices to operate in the second mode.

44. The system of claim 43, wherein the second device further comprises logic circuitry to provide content data based upon the received data code groups, and wherein the system further comprises a SONET framer coupled to the second device to receive the content data.

45. The system of claim 42, wherein the system further comprises:
 a third device to receive data from the transmission medium according to an Ethernet protocol; and
 logic circuitry to cause the first and second devices to operate in the first mode.

46. The system of claim 42, wherein the first device further comprises:
 logic circuitry to receive data code groups on each of a plurality of ingress serial data paths; and
 logic circuitry to align the data code groups received on the plurality of ingress serial data paths based upon alignment information inserted among the received data code groups according to the Ethernet protocol when the first device is operating in the first mode.

47. The system of claim 46, wherein the first device further comprises logic circuitry to align the data code groups received on the plurality of ingress serial data paths independently of alignment information inserted among the received data code groups according to the Ethernet protocol when the first device is operating in the second mode.

48. The system of claim 47, wherein the first device further comprises logic circuitry to align the data code groups received on the plurality of ingress serial data paths based upon the detection of errors in the reception of data code groups.

49. The system of claim 42, wherein the alignment information comprises special code groups inserted in each of the egress serial data paths among the data code groups between an end of frame delimiter and start of frame delimiter.

50. The system of claim 42, wherein the second device further comprises logic circuitry to provide content data based upon the received data code groups, and wherein the system further comprises a switch fabric coupled to the second device to receive the content data.

* * * * *